United States Patent [19]

Ayres, Jr.

[11] Patent Number: 4,678,589
[45] Date of Patent: Jul. 7, 1987

[54] REMOVABLE IN-LINE SELF-CLEANING STRAINER FOR PIPING SYSTEMS

[75] Inventor: Walter D. Ayres, Jr., Chicago, Ill.

[73] Assignee: Surgeaco, Inc., Alsip, Ill.

[21] Appl. No.: 842,114

[22] Filed: Mar. 20, 1986

[51] Int. Cl.4 ............................................. B01D 35/02
[52] U.S. Cl. .................................... 210/797; 210/232;
    210/409; 210/447; 210/450; 210/463; 210/499
[58] Field of Search ............... 210/779, 791, 232, 411,
    210/447, 308, 310, 407, 409, 446, 449, 450, 460,
    463, 499, 797; 55/328, 480, 481

[56] References Cited

U.S. PATENT DOCUMENTS

| | | | |
|---|---|---|---|
| 1,631,822 | 6/1927 | Jahn | 210/308 |
| 3,372,807 | 3/1968 | Barnard | 210/310 |
| 3,469,705 | 9/1969 | Thomas | 210/447 |
| 3,816,176 | 6/1974 | Rundqvist | 210/411 |
| 4,051,042 | 9/1977 | Tullier | 210/447 |

Primary Examiner—Richard V. Fisher
Assistant Examiner—Wanda L. Millard
Attorney, Agent, or Firm—Milton S. Gerstein; Marvin N. Benn; Esther O. Kegan

[57] ABSTRACT

An in-line, inclined strainer device in which the strainer proper is removably mounted within a casing, which casing is mounted in-line in a piping system, such that the strainer may be removed in an easy manner for subsequent replacement and/or cleaning. The strainer is mounted by a removable tubular element having an elliptically-cut end for mounting directly to it an elliptically-shaped screen mesh forming the strainer proper. The end of the tubular element is mounted in a linear portion of a casing through which flows the liquid of the piping system, so that the screen mesh may entrap solids. Diametrically opposite to the tubular element is a drainage duct which, when opened, allows the flow of the liquid to pass through, carrying away with it the effluent sedimented and debris in the drainage duct. The strainer proper includes a plurality of rods that are welded to the lower end of the tubular element, which rods directly mount the screen mesh. The tubular element also provides for a flow of the liquid into it during normal full-flow conditions of the piping system, such that a pressure head is provided in it to create a small back-washing turbulence about the screen. The screen mesh may be self-cleaned, in combination with the pressure head, by the injection of a spray from a nozzle positioned in a cover directly above the tubular element, which is carried out simultaneously with the opening of the drainage duct.

14 Claims, 7 Drawing Figures

REMOVABLE IN-LINE SELF-CLEANING STRAINER FOR PIPING SYSTEMS

BACKGROUND OF THE INVENTION

The present invention is directed to an in-line, inclined self-cleaning strainer for piping systems by which particulates are removed from the flowing medium in the piping system. There are a great variety of structures for strainers in piping systems which remove solids and particulates from the flowing medium. Examples of such strainers are basket-type strainers in which the flowing medium passes through a basket-like wire mesh, thereby trapping the sediment in the basket, and a Y-type strainer, with the flowing medium flowing through one branch of the "Y" into the other branch, in which the entrapped sediments may be released via a check valve or the like. The basket-type strainer is typically used in horizontal disposition, while the Y-type is generally used in vertical orientation, although it may also be used in horizontal orientation. However, what is important is that elements within the piping system be protected from invasion by solid particulates, and the like, so as not to impair and/or cause breakdown of the parts. For example, it is imperative that strainers be placed in close proximity to inlet of pumps. Strainers are also used for protecting condensers, heat exchangers, meters, spray nozzles, turbines, traps, and the like. Without strainers, piping systems would have considerably shorter life span than at present.

The same recurring problem with all strainers is that, at some juncture, they must be cleaned from the debris imbedded in the screen mesh and the accumulated particulates in the drain. The simplest way of doing this is by manual operation in which an operator will remove the strainer from its connection to the piping system, and clean or replace it with a new mesh material. The strainer may also be cleaned by providing a spray nozzle that injects a spray against the screen for "backflushing." During the flushing operation, a drain valve is opened which removes the evacuated debris from the piping system. Another type is an automatic self-cleaning strainer by which the flowing medium is never shut off, but is actually used to provide cleaning to the strainer, in contradistinction to the back-flushing technique where the system must be shut down during cleaning.

It is well known that the provision of a strainer in a piping system will cause some pressure drop. When the strainer is relatively clean of debris, the pressure drop is minimal but, when debris builds up and clings to the mesh material forming the strainer, the pressure drop can be considerable, bordering between 1 and 3 PSI. Therefore, in automatic, self-cleaning straining systems, pressure sensitive devices are placed both upstream and downstream of the strainer, and the pressure drop is measured across the strainer. At a preset and predetermined pressure drop across the strainer, a valve is actuated to drain the system and carry away the debris clinging to the strainer material, which is removed therefrom by spraying the strainer and the debris stored in the drainage pipe to which the valve is connected. Typically, this automatic, self-cleaning strainer system is set to be actuated when there is a pressure differential between 1 and 3 PSI, which is approximately equal to that condition where 50% of the strainer open area is clogged by debris. Another means by which automatic self-cleaning may be carried out is to use timed, periodic cleaning, without guaging the pressure drop across the strainer. Of course, the frequency of such self-cleaning may be varied to suit the particular environment in which the strainer is placed. Automatic, self-cleaning strainers are usually and typically used for piping systems carrying water, since it is easier to dispose of the drained water than another liquid not easily disposed of. Automatic self-cleaning also has the advantage of allowing less open area for strainer per given cross-sectional area of piping, since it is cleaned more often and, usually, more thoroughly.

In systems that are carrying medium that contain a large degree of sediment, solid particulates, rust, and the like, it is common to provide a pair of similar straining devices in parallel, which is generally termed a "duplex formation." This duplex formation allows the use of one strainer at a time, with the other shut off so that it may be cleaned. Appropriate manifolds connect the two parallel and similar straining devices, and valves control the flow of the flowing medium in the piping system through one or the other straining device. This duplex arrangement of straining devices is especially useful in cases where strainers become clogged quite often, requiring frequent cleaning.

The present invention is directed to a straining device mounted in-line with the system. That is, the straining device is directed to that class of strainers mounted parallel to the flow of the flowing medium in the piping system, so that the flowing medium passes from one portion of the piping system to the next directly through the strainer, rather than traveling from the portion of the piping system to the strainer in a curved or zigzag path. The advantage of an in-line straining device is that the pressure drop across the strainer is considerably reduced, since therre are no zigzag or curved paths by which the flowing medium must first pass to flow to the straining device and, thereafter, to flow from it back into the main piping system. Another advantage of such an in-line straining device is that it is generally simpler and less expensive to produce and install.

One of the disadvantages that have hitherto prevailed in such in-line straining devices is that cleaning of the straining material has proven difficult and of times impossible, thereby necessitating complete replacement of the straining device. Furthermore, even if replacement and/or repair of the strainer were possible in an in-line straining device, access to the plate mounting the strainer mesh in the main body casing of the device is extremely difficult, time consuming and entirely manual. The prior-art technique of cleaning the strainer requires a spray nozzle above the wire mesh forming the strainer, with the attendant shut down of the system, to allow for such cleaning, flushing and drainage of the sprayed water and released debris. While it is possible to provide automatic self-cleaning in an in-line straining device, without having to shut off the flow of the flowing medium of the piping system, the prior-art structure and technique have proven that it is costly and cumbersome to do so, requiring a re-routing or curved path for the flowing medium which, to some extent, defeats the purpose of using an in-line strainer in the first place: To wit, creation of a smaller pressure drop across the strainer body. Furthermore, in systems that require frequent cleaning of the straining device, the automatic, self-cleaning devices of the in-line type have proven expensive and less than satisfactory.

SUMMARY OF THE INVENTION

It is, therefore, the primary objective of the present invention to provide an in-line straining device for use in piping systems such that automatic self-cleaning thereof is possible without the shut-down of the system, and which also allows easy removal of the straining device from its in-line position in the piping system for replacement and/or cleaning of the straining element itself by manual operation.

It is another objective of the present invention to provide such an in-line strainer that is removable from the piping system so that removal of the device is easy, foolproof, and quick.

It is still another objective of the present invention to provide for the duplex arrangement of the in-line system incorporating all the advantages of having each straining device removable from the piping system.

It is yet another objective of the present invention to provide an in-line, removable straining device in a piping system, such that there is constant and continual self-cleaning of the straining element itself during all flow of the flowing material, by the provision of an upper, liquid head directly adjacent and above the straining element, which provides a measure of up-and-down movement to the head volume elevated above the screen mesh. Such up-and-down movement will help to dislodge particulates in the wire mesh of the strainer, especially when used in combination with a spray nozzle positioned above the upper, liquid head.

It is still another objective of the present invention to provide an in-line straining device for piping systems such that the conventional spray nozzle used for cleaning the strainer provides a spray that has a greater force when in use, since it is incorporated in the housing of the straining device of the present invention such that its spray is directly into an elongated, cylindrical space.

Toward these and other ends, the in-line straining device of the present invention has a main housing provided with end connecting-flanges for connecting the straining device to a piping system. The main housing includes a centrally located, integral and upstanding cylindrical, hollow portion which is closed by a removable cover. The removable cover mounts therein a conventional sprinkler for injecting spray into the interior of the housing towards the straining element mounted below it, for cleaning the strainer. The separate and distinct strainer-mounting tube is provided with an elliptically-cut end thereof which mounts to the strainer proper, so that the strainer is positioned in-line of the flowing medium, which medium flows through the housing from one end connecting-flange to the other. The strainer-mounting tube is provided with an upper handle-portion by which the tube may be gripped and removed from the main housing after the cover portion has been removed. Diametrically opposite to the upper, hollow cylinder of the main housing is a drainage pipe used for draining away the debris and particulates sedimented therein, and any other debris removed from the wire mesh material of the screen forming the strainer proper, which debris is removed from the screen by the injection of the spray, or by the back-washing via the up-and-down movement of the head of liquid provided in the upper, hollow cylinderr mounting the strainer tube. The strainer proper itself includes a wire mesh which, in conventional fashion, is elliptical, and includes a series of metal rods forming a latticework defining a plurality of rectangular cutouts to which is mounted the screen proper, or wire mesh.

When cleaning the in-line straining device of the present invention, the head reserve provided in the upper, cylindrical-portion, which mounts the tube for mounting the strainer proper, is supplemented with the spray from the spraying device mounted in the cover. The combination of the up-and-down movement of the head in the hollow cylinder, along with the spray, provides excellent cleaning jets by which any material plugging up an open space of the screen mesh is removed and carried away via the drain. This cleaning process is carried out while the flowing medium is still flowing in the piping system, since, when a valve is opened allowing the drainage water to exit through the drainage pipe thereof, the combination of the head reserve in the upper, cylindrical, hollow portion and the spray from the spray nozzle causes enough turbulence so that all flowing medium is directed at an angle to exit through the drainage pipe. Thus, the system never needs to be shut down for cleaning purposes.

BRIEF DESCRIPTION OF THE DRAWINGS

The invention will be more readily understood with reference to the accompanying drawings, wherein.

DETAILED DESCRIPTION OF THE DRAWINGS

Figure 1:
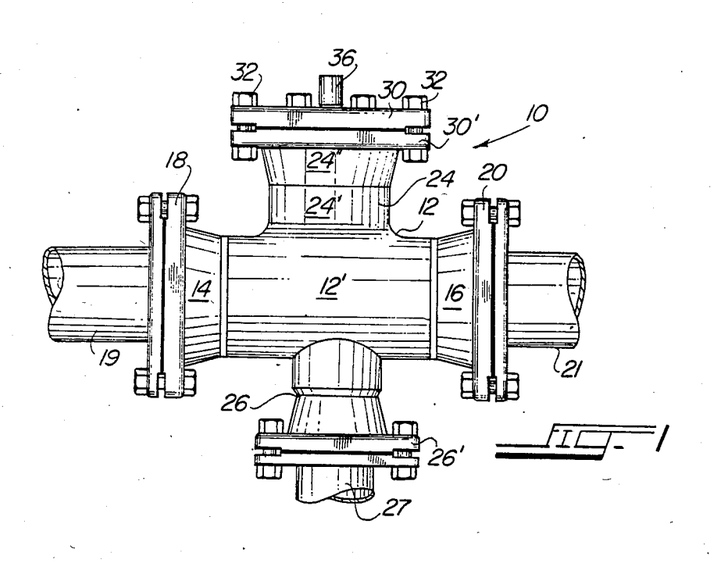
FIG. 1 is side elevational view of the in-line straining device of the present invention.
Figure 2:
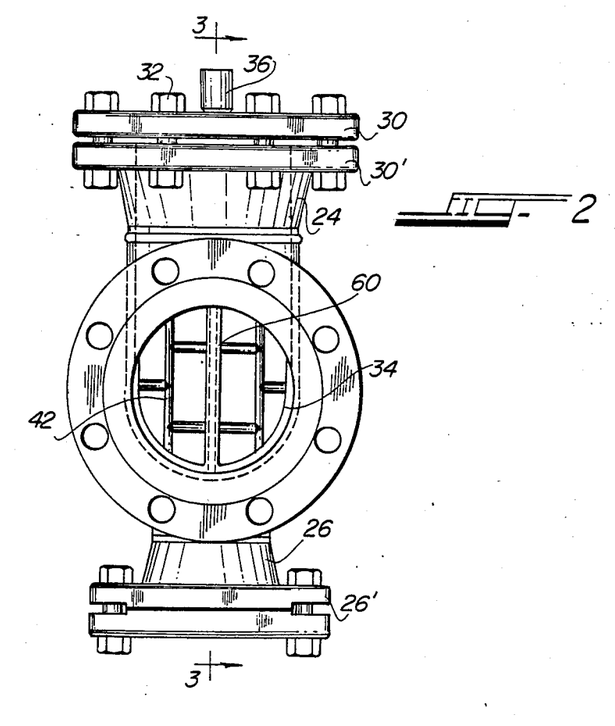
FIG. 2 is an end view of the in-line straining device of FIG. 1.

Referring to the drawings in greater detail, the in-line straining device according to the present invention is indicated generally by reference numeral 10 in FIG. 1. The in-line straining device 10 includes a main housing 12 provided with a pair of truncated-cone end-portions 14 and 16 through which the flowing medium passes. The strainer element of the present invention is mounted within the hollow interior of the middle section 12' of the main housing to, thus, constitute the in-line type of strainer device. A pair of end connecting-flanges 18 and 20 are also provided for connecting the device 10 in-line to portions of the piping system, such as pipes 19 and 21, respectively. The in-line strainer device 10 of the present invention is typically used directly adjacent to the inlet of a pump, although its use is not restricted thereto. The main housing 12 is also provided with a pair of oppositely-disposed conduits 24 and 26, the conduit 24 constituting a hollow, cylindrical projection from the main, central portion 12', the hollow interiors of which communicate. The section 26 constitutes a drainage pipe, in a conventional manner. The drainage conduit 26 is provided with an appropriate end flange 26' for connection to another pipe 27 serving as the drainage outlet, or the end flange 26' may be connected directly to a control valve for opening and closing the drainage pipe 26 for controlling the cleaning and flushing of the straining device 10 and drainage pipe. The drainage conduit 26 constitutes an accumulator in which the debris, removed from the flowing medium in the piping system, is deposited for eventual removal during the cleaning of the strainer.

The upper conduit 24 is closed by cover-portion 30, which cover-portion 30 is removably connectable to the upper connecting-flange portion 30' of the conduit 24 via bolts 32, or the like. The cover-portion 30 includes a central hole through which is mounted a conventional spray nozzle 36, as shown in FIG. 1. Flange portions 30 and 30' are generally circular in shape. It may, therefore, be seen that the entire interior of the main housing 12 is hollow, the hollow portions of each portion being continuous and in direct communication with each other to thereby allow the flow of liquid with each portion thereof, according to the circumstances warranting the use of the strainer device 10. The main housing 12 is preferably made of forged material, such as carbon steel or stainless steel, with appropriate sections being welded to each other, such as lower portion 24' of conduit 24 and the upper, frustro-conical section 24" thereof. Thus, when the straining device 10 is mounted in-line in a piping system between, for example, conduits 19 and 21, the liquid flows through the portions 14, 12', and 16, to exit into the pipe 21.

Figure 3:
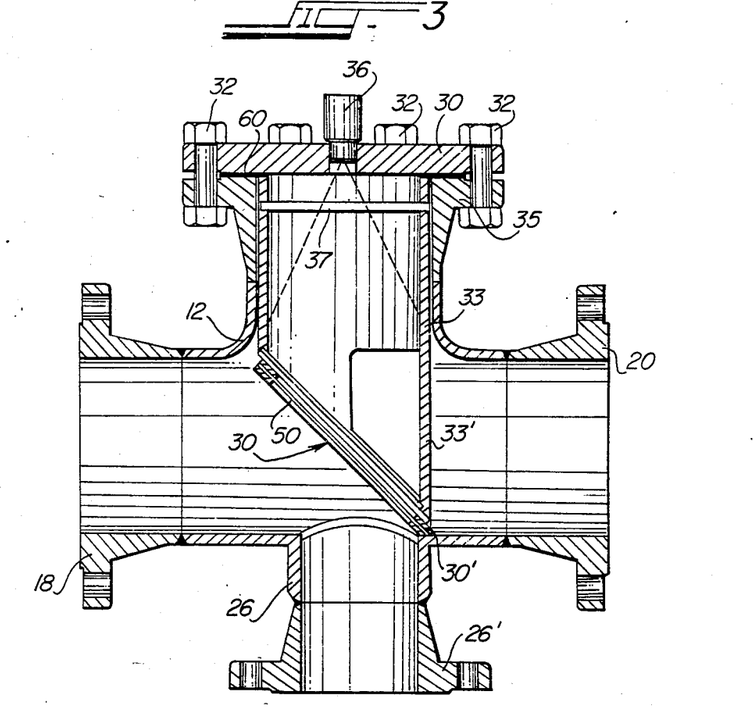
FIG. 3 is a cross-sectional view taken along line 3—3 of FIG. 2.

The in-line, inclined strainer of the present invention is mounted within the middle section 12' of the main housing, in a manner as best seen in FIG. 3. Referring to FIG. 3, the strainer is mounted approximately midway between the end-flanges 18 and 20, with the incline thereof allowing for the mounting of the elliptical strainer within the generally cylindrical, hollow interior of the main housing. Thus, in the conventional manner, the flowing liquid passes through the strainer indicated generally by reference numeral 31 in FIG. 3, during which passage particulates, solids, rust, and the like, are removed from the liquid and subsequently deposited in the drainage pipe 26 via the settling thereof. Some portions, however, inevitably become lodged within the screen material itself, to be removed later on using the method of the present invention. The strainer proper 31 is removably mounted within the middle section 12' by a truncated, hollow, cylindrical member 33. The cylindrical or tubular member 33 mounts the strainer proper 31 at its lower truncated end thereof, such that the strainer proper lies in the inclined position as shown in FIG. 3. The tubular member 33, as mentioned above, is truncated at its lower end, such that an elliptical, lower rim or mounting portion is established, indicated generally by reference numeral 34 in FIG. 5. This lower, elliptical end or rim 34 allows the direct attachment of a backing grating or latticework to which is mounted the screen mesh or perforated sheet forming the straining material. The tubular member 33 extends substantially upwardly, so that its upper end lies substantially coplanar with the upper end of the uppermost portion 35 of the truncated-conical portion 24" of the conduit extension 24. The upper portion of the tubular member 33 mounts a transverse rod 37, as clearly shown in FIG. 3, which rod 37 serves as a handle by which the tubular member 33 may be gripped by a hand and pulled out of the main housing 12, after removal of the cover 30. Thus, it can be seen, that the strainer proper 31 is removably mounted within the main housing 12 such that, when replacement or manual cleaning is required or needed, the entire tubular element 33 along with the conjoint strainer proper 31 may be removed and cleaned outside of the piping system in an easy and readily accessible manner. If replacement of the strainer element 31 is required, easy replacement is accomplished by simply removing the bolts attaching the strainer proper to the tubular member. This is a distinct advantage over the prior-art, in-line, inclined straining devices which have effectively prevented access to the strainer proper, since the mesh material forming the strainer was bolted to a backing plate, which backing plate was welded within the hollow interior of a pipe. Access to the bolts and backing plate within the hollow pipe was practically impossible and, if possible, quite difficult. Furthermore, in these conventional prior-art, in-line, inclined straining devices, if one or more of the bolts securing the strainer proper to the backing plate were to become broken or impossible to turn, the entire unit would need replacement.

Figure 4:
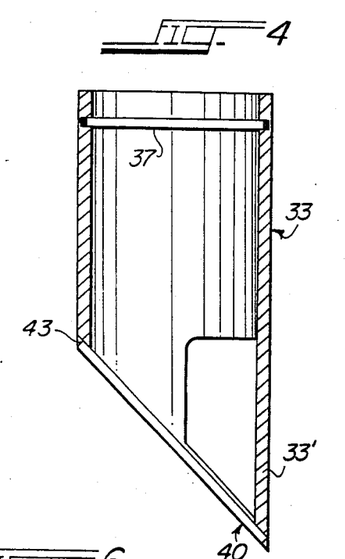
FIG. 4 is an elevational, cross-sectional view of the strainer-mounting tube with the latticework or grating of rods for securement to the wire mesh of the strainer proper.
Figure 5:
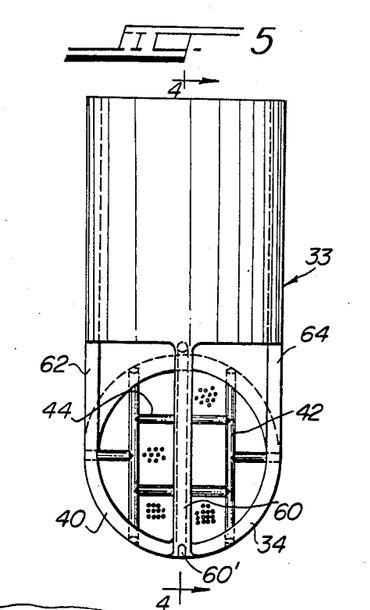
FIG. 5 is a front view of the tube for mounting the strainer of FIG. 4.
Figure 6:
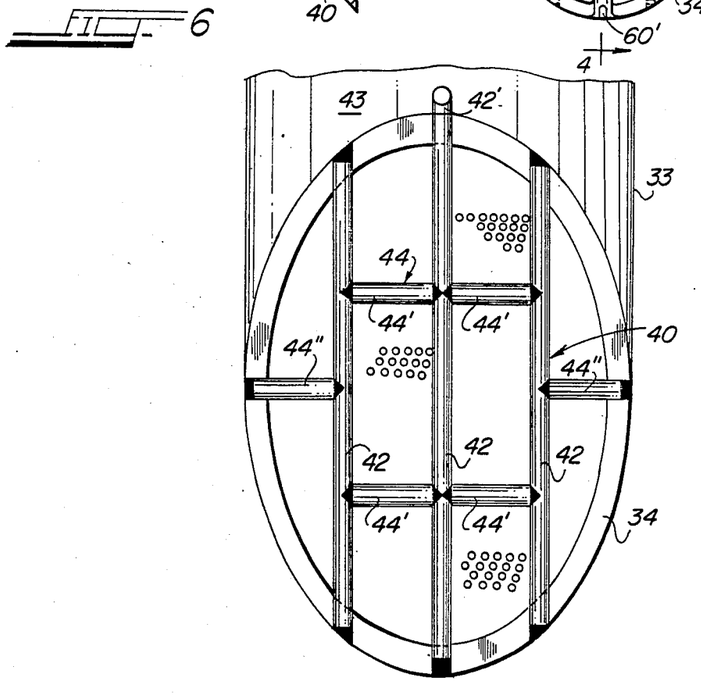
FIG. 6 is a detail view showing the elliptical shape of the strainer proper and the elliptical, lower end of the mounting tube for the strainer.
Figure 7:
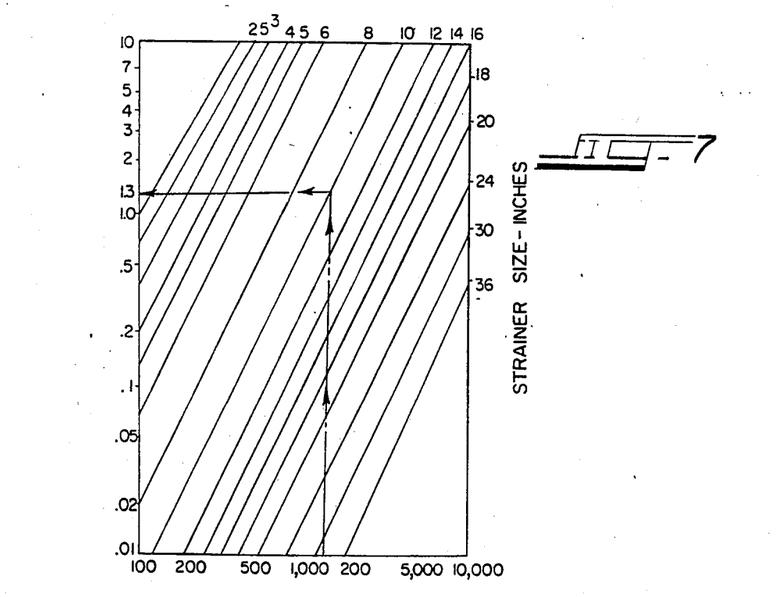
FIG. 7 is a chart showing the liquid pressure drop across the strainer for selected strainer sizes, for different rates of flow of flowing liquid.

Referring now to FIGS. 5 and 6, the strainer proper may best be seen. The strainer proper is made up of a grating or latticework of metal rods indicated generally by reference numeral 40. The grating or latticework 40 is made up of a plurality of major axis rods 42, preferably three in number. A plurality of minor axis, transverse metal rods are also provided and indicated generally by reference numeral 44. Preferably six such transverse rods 44 are provided, so that four of them, indicated by reference numerals 44', interconnect the major axis rods 42, while a pair of other transverse rods 44" interconnect the outer two major axis rods to the rim 34 at the minor axis thereof, as clearly shown in FIG. 6. Each of the rods 42 and 44 is butt-welded at the ends thereof to the appropriate elements connected thereto. The latticework 40 thus defines a plurality of open and bounded spaces defined between the rod members 42 and 44 and the rim 34. The ends of the major axis rods 42 are also butt-welded to the rim 34, except for the end 42' of the central, major axis rod 42, which is welded to both the rim 34 and the lower edge-portion 43 of the tubular element, which lower edge-portion 43 constitutes the highest elevation of the lower end of the tubular element, indicated generally in FIG. 4. The latticework 40 of rods 42 and 44 thus establishes a backing or support structure over which is mounted a conventional, elliptical screen mesh, indicated generally by reference numeral 50 in FIG. 3. The screen mesh or perforated sheet 50 is placed in juxtaposition and overlapping relationship to the latticework 40. The screen mesh is secured by bolts. Referring to FIG. 3, a sealing gasket 31' of U-shaped cross-section is provided about the outer circumference of the screen mesh 31. This resilient gasket seals the wire mesh or screen to the lower end of the tubular element. As can be seen in FIG. 3, the lower portion of the sealing gasket 30' is held against the inner, circumferential wall of the middle section 12' of the main body portion 12, thus providing a seal. The upper portion of the tubular member 33 is also sealed via an annular gasket ring indicated generally by reference numeral 60 in FIG. 3, the sealing of which is consummated upon the fixed attachment of the cover 30 to the end connecting-flange 35. Thus, the tubular member 33 and strainer proper thereof are completely and firmly sealed within the housing 12. The annular, resilient gasket 31' sandwiches the screen mesh 50, as clearly shown in FIG. 3.

The tubular member 33 is formed with a suitable cutout on the portion thereof directly adjacent to the opening of the end-portion 16 of the main body portion 12. This portion of the tubular element is indicated generally by reference numeral 33' in FIG. 3. The opening therein provides for the flow of the liquid. This portion 33' includes an elongated, supporting rib-member 60, as seen in FIG. 5, which is connected at its lower end 60' to a portion of the rim 34. Additional structural support is provided by arcuate connections 62 and 64 shown in FIG. 5.

The in-line straining device of the present invention also offers a novel method of cleaning the screen mesh. With reference to FIG. 3, the self-cleaning of the strainer proper 31 is accomplished during full-flow conditions of the liquid in the piping system, such that the liquid is allowed to flow within the hollow interior of the main housing 12. Also, during normal flow of the liquid in the piping system, as the liquid passes through the strainer 31, a head is built up within the hollow interior of the tubular member 33 above the strainer element 31. This pressure head of liquid tends to rise and fall in accordance with the slight pressure drop across the strainer 30, and also in response to the boundary flow of the liquid adjacent the surface of the hollow interior of the main body portion 12. The head within the hollow interior of tubular member 33 is cyclical, which is defined by the fact that all pressure waves within the system are cyclical. This up-and-down movement of the pressure head within the hollow interior of the tubular member 33 causes a slight turbulence around the strainer element 31, though such turbulence is practically insignificant so as to define practically no additional pressure drop. This slight turbulence helps to cause the unplugging of clogged sediment, particulates, and the like, in the open areas of the screen mesh 50. This turbulence around the screen mesh 50 may be enhanced by the operation of the spray nozzle 36, which injects its spray against the inner surface area of the tubular member 33. The force of the spray from the nozzle 36 causes an increased turbulence, thus enhancing the dislocation of the embedded particles in the screen mesh 50. In combination with the activation of the spray nozzle 36, the drainage pipe 26 may be opened, thus causing a considerable turbulent flow exiting through the drainage pipe 26. Such turbulent flow associated with the opening of drainage pipe 26 causes all sediment, or the like, contained within the drainage pipe 26, along with the dislocated particles from the screen mesh 50, to exit into an appropriate collection vessel positioned below the drainage pipe. As stated above, all this is achieved during the full-flow condition of the liquid in the piping system.

In contrast to prior-art techniques of self-cleaning while full-flow conditions are occurring, the present invention does not require a re-routing of the flowing medium around the straining device during cleaning, but allows the flow to continue in its usual fashion. Furthermore, since the full-flow is not re-directed around the strainer element, the energy associated with the flowing liquid may also be used to dislodge entrapped particulates, solids, rust, and the like, in the open spaces of the screen mesh 50, to thereby establish a more thorough and effective cleaning process. It is to be noted, of course, that for very frequent cleanings of the strainer 31, the spray nozzle 36 may be used in conjunction with the turbulence created thereby and by the pressure head associated with the hollow interior of the tubular member 33, alone. For more thorough cleaning, however, the opening of the drainage pipe 26 is required. The fact that the latticework or grating 40, defining a backing member for the screen mesh 50, is provided with a plurality of intersecting rod-members that define substantially large, open spaces, the spray from the nozzle 36 may generally enter into all open portions of the screen 50. Thus, the effective screening area of the strainer 31 may be enhanced, since such effective area is defined by the percentage of open area of the screen mesh times the percentage of the open area of the backing plate. Since the backing plate is a substantially open area having very large open spaces therein, effective straining area of the strainer element 31 is increased, since the open area of the latticework is large and does not detract from the straining area available to the device in general. Latticework 40 has been so designed as to provide the greatest possible degree of structural integrity for the mounting of the screen mesh to the lower rim 34 of the tubular member 33, while at the same time ensuring that the greatest possible open area is achieved to provide the greatest amount of straining area available, to thereby insure that the lowest possible pressure drop across the strainer element is achieved, whether under fully-clean conditions of the screen mesh 50, or under partially-clogged conditions thereof. The latticework 40 generally defines inner, rectilinear-shaped openings, except at the border thereof which defines generally triangular-shaped outer openings, which openings are defined between the latticework and the rim 34. The precise orientation and locations of the rods 42 and 44 of the latticework are that which are most optimal to both structural integrity and the greatest possible open area without compromising such structural integrity. Whereas prior-art techniques have had to use backing plates having circular holes or the like therein, the present invention has chosen that which is disclosed in FIG. 6 in order to achieve the results mentioned above.

The screen mesh 50 is secured to the latticework or grating 40 via four holes provided in the screen mesh, which holes are backed by washers welded thereto. Conventional tinnerman-type fasteners are used to secure the screen mesh to the appropriate rods 42 and 44 directly adjacent the openings in the screen mesh. A tinnerman-type fastener includes a female-threaded opening which receives a threaded male portion that is projected through the open hole in the screen mesh for securement to the female portion of the tinnerman-type fastener, to securely attach the screen mesh to the grating or latticework 40. Other appropriate securing means for fastening the screen mesh to the grating or latticework 40 may, of course, be used.

In FIG. 10, a chart is shown indicating the liquid pressure drop for a select group of strainer sizes. The coordinate axis indicates a pressure drop in PSI, while the abscissa indicates flow in gallons per minute. The series of lines indicated in the chart show strainer sizes in inches, ranging from 2 inches to 36 inches. The results shown in FIG. 10 were obtained empirically and based on water as a flowing medium, at a velocity of 10 feet per second maximum velocity under standard conditions.

The present invention may also be used in an automatic drain-type environment, in which pressure sensing guages are placed both upstream and downstream of the screen element to trigger the automatic cleaning of the screen at a preset and predetermined pressure drop, such as a 3 or 4 PSI differential. Of course, other well-known and conventional automatic control techniques may be used, such as a timing sequence, where the strainer is cleaned at periodic and fixed intervals according to the environment in which the strainer is used and according to the flowing medium present. Of course, a combination of both timed and pressure detection may be used for the initiation of the automatic cleaning cycle. Also, clearly, the particular size of the strainer, the screen mesh used, and the particular open areas formed by the latticework or grating 40 may be that chosen to best fit the condition and environment in which the present invention is to be used.

The present invention is also directly suited to a duplex arrangement, by which a pair of strainer devices of the present invention are provided in parallel formation, so that, while one is being used for straining particulates from the flowing medium, the other may be cleaned. Such a duplex arrangement would preferably be used in a flowing medium that is extremely dirty and filled with sediment, rust, and/or particulates. In such an arrangement, both straining devices would have a common intake manifold and a common exhaust manifold, with each strainer device having its own on/off intake valve and exhaust check valve. Any other of the conventional and well-known techniques of initiating the operation of any of the valves may be used in the present invention.

While a specific embodiment of the invention has been shown and described, it is to be understood that numerous changes and modifications thereof may be made without departing from the scope, spirit and intent of the invention, as set out in the appended claims.

What is claimed is:

1. In an in-line, inclined strainer device for piping systems, wherein said strainer device comprises a main housing having a hollow interior, a screen-mesh means for entrapping solids and particulates in the liquid flowing in the piping system, means for mounting said screen-mesh means within said main housing in an inclined orientation, said main housing having an inlet opening and an outlet opening with said screen-mesh means being interposed such that the liquid flowing in the piping system flows through said screen-mesh means, wherein the improvement comprises:

said main housing having a hollow extension extending at an angle with respect to the direction of the flow of the liquid through said main housing, said hollow extension cooperating with said hollow interior of the remainder of said main housing;

said means for mounting said screen-mesh means comprising a tubular member for insertion into and removal out of said hollow extension of said main housing, said tubular member mounting said screen-mesh means at one end thereof, said one end being substantially arcuate in cross-section and having a major axis and a minor axis thereof, so that a similarly-shaped screen-mesh means may be mounted directly thereto for insertion in said main housing along the path of flow of the liquid in the piping system;

cover-means for closing the upper end of said tubular member and the upper end of said hollow extension of said main housing;

said one end of said tubular member being elliptical in cross-section; said screen-mesh means comprising a grating of interconnected rods defining a plurality of open spaces, and a screen-mesh mounted directly to said grating for fixed connection therewith; and said main housing comprising a drainage-pipe means positioned diametrically opposite to said tubular member, such that said drainage-pipe means is on the other side of said screen-mesh means as compared to said tubular member; said drainage-pipe means comprising means for closing an open end thereof, so that, during self-cleaning of said screen-mesh means, the effluent water carrying away the sediment and particulates may be carried away and drained into a refuse area for subsequent disposal.

2. The improvement according to claim 1, wherein said hollow extension of said main housing extends at substantially right angles to the path of flow of liquid in said main housing between said inlet and said outlet, said drainage-pipe means lying substantially diametrically opposed to said hollow extension on the other side of said one end of said tubular member mounting said screen-mesh means; said tubular member comprising a handle means in another end thereof remote from said one end thereof by which a hand may grip said handle means for removing said tubular member from said main housing, said handle means being mounted in the interior of said tubular member; said cover means for closing the upper end of said hollow extension comprising a substantially centrally-located opening therein; and nozzle means mounted in said centrally-located opening of said cover means for injecting a spray into the interior of said tubular member for the self-cleaning of said screen-mesh means during the self-cleaning thereof.

3. The improvement according to claim 2, wherein said screen-mesh means comprises a screen mesh having formed therein a plurality of openings by which the solids and particulates are trapped, and a latticework means defining a series of relatively large open holes, and means for securing in a fixed manner said screen mesh to said latticework means; said latticework means being fixedly connected to said one end of said tubular member, whereby said screen-mesh means is secured to said tubular member for movement therewith for removal of said screen-mesh means from said main housing; said screen-mesh means further comprising an annular gasket surrounding said screen mesh, said tubular member mounting said screen-mesh means in the hollow interior of said main housing in the path of flow of the liquid in said piping system, such that said annular gasket is in substantial contact with an inner surface wall portion of said main housing.

4. The improvement according to claim 1, wherein a plurality of said open spaces formed by said grating are substantially rectilinear in shape; said screen-mesh means further comprising an annular seal surrounding said screen mesh for forming a seal with at least a portion of the interior of said main housing along the path of flow of the liquid in said main housing, and means for fixedly connecting said screen mesh to said grating.

5. The improvement according to claim 1, wherein said tubular member and said hollow extension of said main housing have coincidental major longitudinal axes thereof; said tubular member fitting entirely within said hollow extension and projecting outwardly from said remainder of said main housing, so as to define a hollow, enclosed space above said screen-mesh means in which may be formed a tertiary pressure head by the flowing liquid flowing in said main housing, said tertiary pressure head providing small amounts of turbulence about said screen-mesh means to substantially aid in the cleaning of the screen-mesh means during the self-cleaning thereof.

6. The improvement according to claim 1, wherein said tubular member comprises a handle means mounted adjacent to the other end of said tubular member such that, when said cover means for closing said upper end of said hollow extension is removed, said handle means is readily accessible to the hand for easily removal of said tubular member and attached screen-mesh means from said main housing, for subsequent cleaning and/or replacement of said screen-mesh means.

7. An in-line straining device for removing solids, particulates, and rust from liquid flowing in a piping system, comprising:
 a casing having a hollow interior;
 said casing having a first end comprising a first connecting-flange, and a second end having a second connecting-flange, said connecting-flanges mounting said casing in-line in a piping system so that the liquid flowing in said piping system flows directly in said hollow interior of said casing, said connecting-flanges being mounted to a substantially linear portion of said casing;
 said casing further comprising an offset portion defining a hollow interior cooperating with the hollow interior of said substantially linear portion;
 screen-mesh mounting means at least a portion of which is removably mounted within said hollow interior of said offset portion of said casing;
 said screen-mesh mounting means comprising a first end substantially positioned within the hollow interior of said substantially linear portion of said casing when said screen-mesh mounting means is mounted to said casing, and a second end remote from said first end and spaced from said substantially linear portion of said casing;
 means for closing said second end of said screen-mesh mounting means when said screen-mesh mounting means is mounted to said casing;
 a substantially elliptically-shaped screen-mesh means fixedly connected to said first end of said screen-mesh mounting means such that, when said screen-mesh mounting means is mounted to said casing, said screen-mesh means is positioned substantially within the entire hollow interior of said substantially linear portion of said casing, so that the liquid flowing in said piping system flows directly through said screen-mesh means for removing solids, particulates, and rust from the liquid;
 means for fixedly connecting said screen-mesh means to said first end of said screen-mesh mounting means, whereby upon cleaning and/or replacement of said screen-mesh means, said screen mesh is easily removable from said casing to provide ready access thereto; and
 said screen-mesh mounting means being cylindrical in shape, said first end thereof being angle-cut to form a substantially arcuate rim to which said screen-mesh mounting is connected; said screen mesh mounting means being formed with a through opening in surface portion thereof contained within said linear portion of said casing when said screen-mesh mounting means is mounted to said casing.

8. The in-line strainer device according claim 7, wherein said screen-mesh means comprises a screen mesh having an arcuate configuration, and a grating comprising a series of interconnecting rod-members defining a series of large openings, means for fixedly connecting said screen mesh to at least some of said rods of said grating, and an annular sealing member surrounding said screen mesh for providing a seal between said screen mesh and a substantial arcuate portion of the inner surface area of said substantially linear portion of said casing.

9. The in-line strainer device according to claim 8, wherein said rod members of said grating are welded to said first end of said screen-mesh mounting means to provide fixed connection thereof; said rod members of said grating defining inner, rectilinear-shaped openings, which openings are substantially of large dimension so as to provide the greatest possible structural integrity for mounting said screen-mesh means while at the same time allowing the greatest possible flow of liquid therein, so as to achieve the greatest possible structural integrity with the least amount of pressure drop across said screen-mesh means; said casing further comprising means for sealing said second end of said screen-mesh mounting means in said offset portion.

10. The in-line strainer device according to claim 7, wherein said screen-mesh means is mounted in an inclined manner in said substantially linear portion of said casing when said screen-mesh mounting means is positioned in said casing; said casing further comprising a drainage conduit having a hollow interior in fluid communication with the hollow interior of said substantially linear portion, said drainage conduit having an inlet opening in fluid communication with said hollow interior of said substantially linear portion which inlet opening faces toward the upstream-side of said screen-mesh means, which upstream side faces toward said first end of said casing, such that all particulates and solids removed by said screen-mesh means may be sedemented in said drainage conduit for eventual removal therefrom.

11. The in-line strainer device according to claim 7, wherein said screen-mesh mounting means comprises a rod portion adjacent said second end thereof, said rod portion serving as a handle by which said screen-mesh mounting means may be removed from said casing for eventual cleaning and/or replacement of said screen-mesh means.

12. A method of cleaning an in-line strainer for a piping system, which in-line strainer is mounted inclinedly in the system such that the liquid in the piping system flows directly through the strainer, said method comprising:
 forming a pressure head directly above the strainer such that when the liquid in the piping system flows through the strainer, part of the liquid forms a head directly above the strainer, so that as the liquid flows into the piping system and through the strainer, the flow thereof, in combination with a slight pressure drop across the strainer, causes cyclical movement to the head above the strainer, thereby creating a washing action to the strainer directly below;
 injecting a spray directly toward the head and toward the strainer, such that the combination of the pressure head and spray causes considerable amount of turbulence about the strainer to dislodge any entrapped particles therein, to thereafter be carried away;
 opening a draining pipe positioned directly below the strainer and in diametrically-opposed relationship to the pressure head formed by said step of forming a pressure head, said step of spraying and said step of opening said drainage pipe being carried out substantially simultaneously;

said step of forming a pressure head above said strainer, injecting a spray directly toward the head and strainer, and opening a drainage pipe all being performed substantially simultaneously, and during full-flow conditions of the liquid flowing in the piping system.

13. An in-line inclined strainer for use in piping systems for removing solids, particulates, and rust from liquid flowing in the piping system, comprising:

a screen-mesh means;

screen-mesh mounting means comprising a tubular member for mounting said screen-mesh at one end thereof, said one end being substantially elliptical in shape and having a major axis and minor axis thereof, said screen-mesh mounting means having a second end spaced from said first end and including a handle means by which said tubular member may be gripped by hand;

said screen-mesh means comprising a grating of interconnected rods defining a plurality of open spaces, and a screen-mesh mounted directly to said grating for fixed connection therewith;

a plurality of said open spaces formed by said grating being substantially rectilinear in shape;

said screen-mesh means further comprising an annular seal surrounding said screen-mesh for forming a seal with a portion of a piping system in which said screen-mesh means is mounted; and means for fixedly connecting said screen-mesh to said grating.

14. The strainer device according to claim 13, wherein said seal comprises a substantially U-shaped cross-sectional member, substantially of elliptical outline, said screen-mesh being received within said U-shaped member.

* * * * *